United States Patent
Nemecek et al.

[11] Patent Number: 5,875,048
[45] Date of Patent: Feb. 23, 1999

[54] LINEAR MULTI-OUTPUT OPTICAL TRANSMITTER SYSTEM

[75] Inventors: Joseph E. Nemecek, Worcester; Michael J. Noonan, Shrewsbury; Amaresh Mahapatra, Acton, all of Mass.

[73] Assignee: CFX Communication Systems, LLC, Northboro, Mass.

[21] Appl. No.: 398,987

[22] Filed: Mar. 6, 1995

[51] Int. Cl.$^6$ .......................... H04B 10/04; H04B 10/155
[52] U.S. Cl. .......................... 359/187; 359/161; 359/188
[58] Field of Search .................................. 359/124–125, 359/127, 130, 132–133, 161, 180, 187, 188

[56] References Cited

U.S. PATENT DOCUMENTS

| | | | |
|---|---|---|---|
| 4,658,394 | 4/1987 | Cheng et al. | 359/126 |
| 4,715,027 | 12/1987 | Mahapatra et al. | 370/3 |
| 4,768,849 | 9/1988 | Hicks, Jr. | 350/96.15 |
| 4,775,971 | 10/1988 | Bergmann | 359/126 |
| 5,002,353 | 3/1991 | Johnson | 350/96.14 |
| 5,031,235 | 7/1991 | Raskin et al. | 455/612 |
| 5,109,441 | 4/1992 | Glaab | 385/1 |
| 5,119,447 | 6/1992 | Trisno | 385/3 |
| 5,148,503 | 9/1992 | Skeie | 385/3 |
| 5,157,744 | 10/1992 | Korotky | 385/2 |
| 5,161,044 | 11/1992 | Nazarathy et al. | 359/157 |
| 5,161,206 | 11/1992 | Djupsjobacka | 385/2 |
| 5,168,534 | 12/1992 | McBrien et al. | 385/3 |
| 5,199,086 | 3/1993 | Johnson et al. | 385/2 |
| 5,210,633 | 5/1993 | Trisno | 359/194 |
| 5,222,089 | 6/1993 | Huber | 372/26 |
| 5,230,028 | 7/1993 | Lin et al. | 385/3 |
| 5,239,401 | 8/1993 | Olshansky | 359/188 |
| 5,249,243 | 9/1993 | Skeie | 385/3 |
| 5,278,923 | 1/1994 | Nazarathy et al. | 385/3 |
| 5,289,550 | 2/1994 | Plastow | 385/9 |
| 5,309,532 | 5/1994 | Chang et al. | 385/3 |
| 5,321,543 | 6/1994 | Huber | 359/187 |
| 5,361,156 | 11/1994 | Pidgeon | 359/161 |
| 5,373,389 | 12/1994 | Huber | 359/195 |
| 5,400,166 | 3/1995 | Huber | 359/173 |

FOREIGN PATENT DOCUMENTS

| | | |
|---|---|---|
| 0251748 | 1/1988 | European Pat. Off. . |
| 2011611 | 7/1979 | United Kingdom . |
| 91/06882 | 5/1991 | WIPO . |

OTHER PUBLICATIONS

Korotky, S. K., and Ridder, R. M., "Dual Parallel Modulation Schemes for Low–Distortion Analog Optical Transmission," *J. on Selected Areas in Communications*, 8(7):1377–1380 (1990, Sep.).

Brooks, J. L., et al., "Implementation and Evaluation of a Dual Parallel Linearization System for AM–SCM Video Transmission," *J. Lightwave Technology*, 11(1):34–41 (1993, Jan.).

Betts, G. E., "Linearized Modulator for Suboctave–Bandpass Optical Analog Links," *IEEE, Trans. MTT*, pp. 1–27 (1994, Dec.).

"Increase Your System Capacity with AELINK Laser Transmission Products," sales brochure, AEL Industries, Inc. (1 page), (1995).

"Fiber–Optic CATV Transmitter," sales brochure ALY–7832–01, (2 pages), AEL Industries, Inc.

(List continued on next page.)

*Primary Examiner*—Leslie Pascal
*Attorney, Agent, or Firm*—Hamilton, Brook, Smith & Reynolds, P.C.

[57] ABSTRACT

A high fidelity, multi-output optical transmission system is configured utilizing a high power continuous wave YAG laser, multiport splitters, and linearized external modulation. An electro-optical modulator design in combination with a c.w. laser, power splits and couplers attains a multi-octave bandwidth transmitter possessing second and third order distortion characteristics of –60 db and a dynamic range >–140 db/Hz. The system includes multiple individually modulated transmitter outputs which effectively provides bandwidth multiplication with full redundancy for increased transmission reliability.

19 Claims, 7 Drawing Sheets

OTHER PUBLICATIONS

Fiber–Optic CATV Transmitter, sales brochures ALY–7832–03, (2 pages), AEL Industries, Inc.

Tan, H. H., "CATV Distribution Over an Optical Fiber with a Linearized Mach Zehnder Modulator and RIN Reduced Laser," Cable TV Sessions, Proceedings of the International Television Symposium and Technical Exhibition, pp. 91–96 (1991, Jun. 13–18).

Nazarathy, Moshe, et al., "Structured Architectures for CATV Distribution with Externally Modulated Solid State Laser Transmitters," Proceedings from Eleven Technical Sessions of the Annual Convention and Exposition of the National Cable Television Assoc., pp. 365–367 (1993, Jun. 6–9).

Willems, F. W., et al., "Harmonic Distortion Caused by Stimulated Brillouin Scattering Suppression in Externally Modulated Lightwave AM–CATV Systems," *Electronics Letters*, pp. 343–345 (1994, Feb. 17).

Farwell, M. L., et al., "Increased Linear Dynamic Range by Low Biasing the Mach–Zehnder Modulator," *IEEE Photonics Technology Letters*, 5(7):779–782 (1993, Jul.).

Johnson, L. M., and Roussell, H. V., "Reduction of Intermodulation Distortion in Interferometric Optical Modulators," *Optics Letters*, 13:928–930 (1988, Oct.).

Chang, W. S. C., "Analog Modulation with Large Linear Dynamic Range" Final Report 1991–92 for MICRO Project #91–020, Univ. of California at San Diego, LaJolla, CA.

Willems, F. W., et al., "Simultaneous Suppression of Stimulated Brillouin Scattering and Interferometric Noise in Externally Modulated Lightwave AM–SCM Systems," *IEEE Photonics Technology Letters*, pp. 1476–1478 (1994, Dec.).

Tsubokawa, M., et al., "Suppression of Stimulated Brillouin Scattering in a Single–Mode Fibre by an Acousto–Optic Modulator," *Electronics Letters*, pp. 473–475 (1986, Apr. 24).

Ohkawa, N. and Hayashi, Y., "Reduction of Bit Error Rate Performance Deterioration Caused by Stimulated Brillouin Scattering in High–Power CPFSK Coherent Optical Transmission Systems," *Electronics Letters*, pp. 515–516 (1994, Mar. 17).

Sano, A., et al., "10 Gbit/s, 300km Repeaterless Transmission with SBS Suppression by the Use of the RZ Format," *Electronics Letters*, pp. 1694–1695 (1994, Sep. 29).

Gopalakrishnan, G. K., et al., "A $LiNbO_3$ Microwave–Optoelectronic Mixer with Linear Performance," *IEEE MTT–S Digest*, pp. 1055–1058 (1993).

Skeie, H., and Johnson, R. V., "Linearization of Electro–Optic Modulators By a Cascade Coupling of Phase Modulating Electrodes," *Integrated Optical Circuits*, SPIE vol. 1583, pp. 153–164 (1991).

Izutsu, M., et al., "Picosecond Signal Sampling and Multiplication By Using Integrated Tandem Light Modulators," *J. of Lightwave Technology*, 1(1):285–289 (1983, Mar.).

"Fiber–Optic CATV Transmitter," sales brochure, ALY–7832–04, (2 pages), AEL Industries, Inc.

"High–Performance Optical Links for the Cable and Cellular Industries," sales brochure, (4 pages), AEL Industries, Inc. (Nov., 1994).

Ishii, Y. and Tsukamoto, K., "Coherent Fiber–Optic Microcellular Radio Communication System Using a Novel RF–to–Optic Conversion Scheme," *IEEE Transactions on Microwave Theory and Techniques*, vol. 43, No. 9, (1995, Sep.).

LINEAR MULTI-OUTPUT OPTICAL TRANSMITTER SYSTEM

BACKGROUND OF THE INVENTION

The cable television (CATV) industry currently transmits video signals over networks which combine fiber optic transmission and coaxial cable. In the typical network architecture, baseband video signals from a number of sources are combined into specific RF frequencies as amplitude modulated vestigial sideband video subcarriers (AM-VSB) and then modulated onto a laser transmitter located at a headend. The fiber optic transmission systems employed for CATV applications today use internally modulated diode lasers. The internal modulation varies the drive current to the diode laser to produce approximately 10 mW of output power. Typically, the 10 mW output is then optically split into three or four outputs and distributed on fiber into the cable feeder plant to three or four nodes as shown in FIG. 1. Each node converts the optical signal to an electrical signal which is then further distributed over a standard tree and branch coaxial cable network to reach approximately 500 homes per node. This network architecture effectively divides the bandwidth of a single laser transmitter between 1500 to 2000 homes, thus limiting the bandwidth per home.

Increased demand for bandwidth to provide new services such as enhanced pay per view, interactive video, and video on demand requires a larger number of channels per node. A desirable network architecture would include the following characteristics:

- low cost per home
- ability to address target markets
- ability to be configured for two-way interactive video services
- high reliability A continuing need exists for further improvements in fiber optic transmission systems that will accommodate these various objectives.

SUMMARY OF THE INVENTION

A fully interactive architecture with the ability to target each individual subscriber may require at least one dedicated video channel per subscriber. One could use a dedicated 2 mW internally modulated laser transmitter, but this would increase the cost per subscriber since the number of internally modulated 2 mW lasers necessary to accommodate larger bandwidths is prohibitively expensive. The present invention provides a linear multi-output optical transmitter system having multi-octave bandwidth multiplication. The solution provided by the present invention allows the full bandwidth to be transmitted so that bandwidth per subscriber is increased. The system takes advantage of optical splitting of a high energy source, external modulation, predistortion, and multi-chip fabrication techniques to provide multiple transmitters having minimized second and third order distortion characteristics.

The approach to the modulation scheme for the present invention is to minimize distortion over a wide bandwidth while providing multiple transmission systems. To minimize the second and third order distortion products, the invention employs a multi-chip module arrangement comprising dual parallel traveling wave Mach-Zehnder interferometers. The dual parallel Mach-Zehnder modulators are combined with a co-located multi-chip electronic driver circuit having feedforward amplifier design which provides pre-distortion shaping to minimize the second and third order distortion residue and enhance performance.

Accordingly, an optical transmission system having reduced second and third order distortion products is provided which includes a continuous wave laser source, e.g., a 300 mW YAG laser, for producing an optical carrier signal, an optical splitter coupled to the laser source for splitting the optical carrier signal to a plurality of splitter outputs, and a plurality of transmitters coupled to respective splitter outputs.

Each transmitter includes a modulator driver, primary and secondary external modulators, and a combiner formed on a single lithium niobate substrate. In the preferred embodiment, the primary and secondary external modulators are Mach-Zehnder modulators. The modulator driver produces primary and secondary driver signals wherein the primary driver signal is scaled and inverted to produce the secondary driver signal. The primary external modulator receives a first portion of the optical carrier signal and modulates the carrie with the primary driver signal to produce a first modulated signal. The secondary external modulator receives a second portion of the optical carrier signal and modulates the carrier with the secondary driver signal to produce a second modulated signal. The combiner superimposes the first modulated signal and the second modulated signal to produce a linearized transmitter output signal.

According to another aspect of the invention, the system further comprises a standby continuous wave laser source and an optical switch for switching between the active laser source and the standby laser source.

According to a further aspect of the present invention, the modulator driver produces the primary and secondary driver signals according to a predistortion function to compensate for second order products produced by the external modulators.

According to still another aspect of the invention, the system further comprises a ratio detector coupled to the combiner output for detecting second and third order distortion products and for generating correction signals to compensate for such distortion products.

The above and other features and advantages of the invention, including various novel details of construction and combinations of parts, will now be more particularly described with reference to the accompanying drawings and pointed out in the claims. It will be understood that the particular optical transmitter system embodying the invention is shown by way of illustration and not as a limitation of the invention.

3

Figure 9:
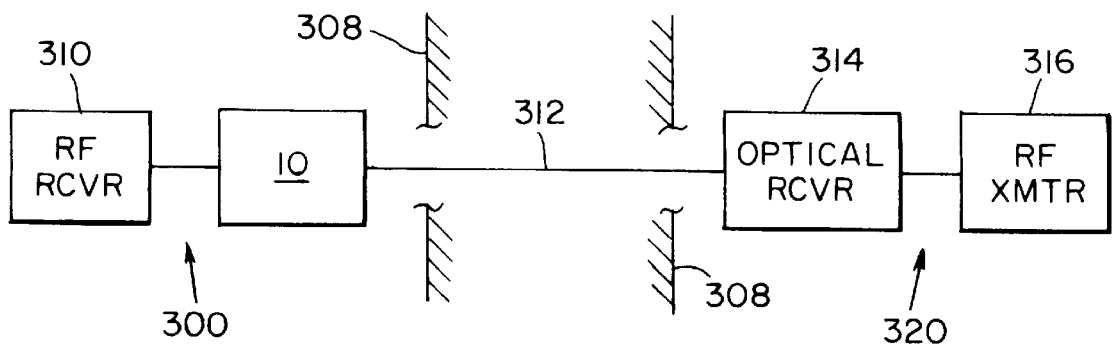

FIG. 9 illustrates the use of the invention in a personal communication network.

Figure 10:
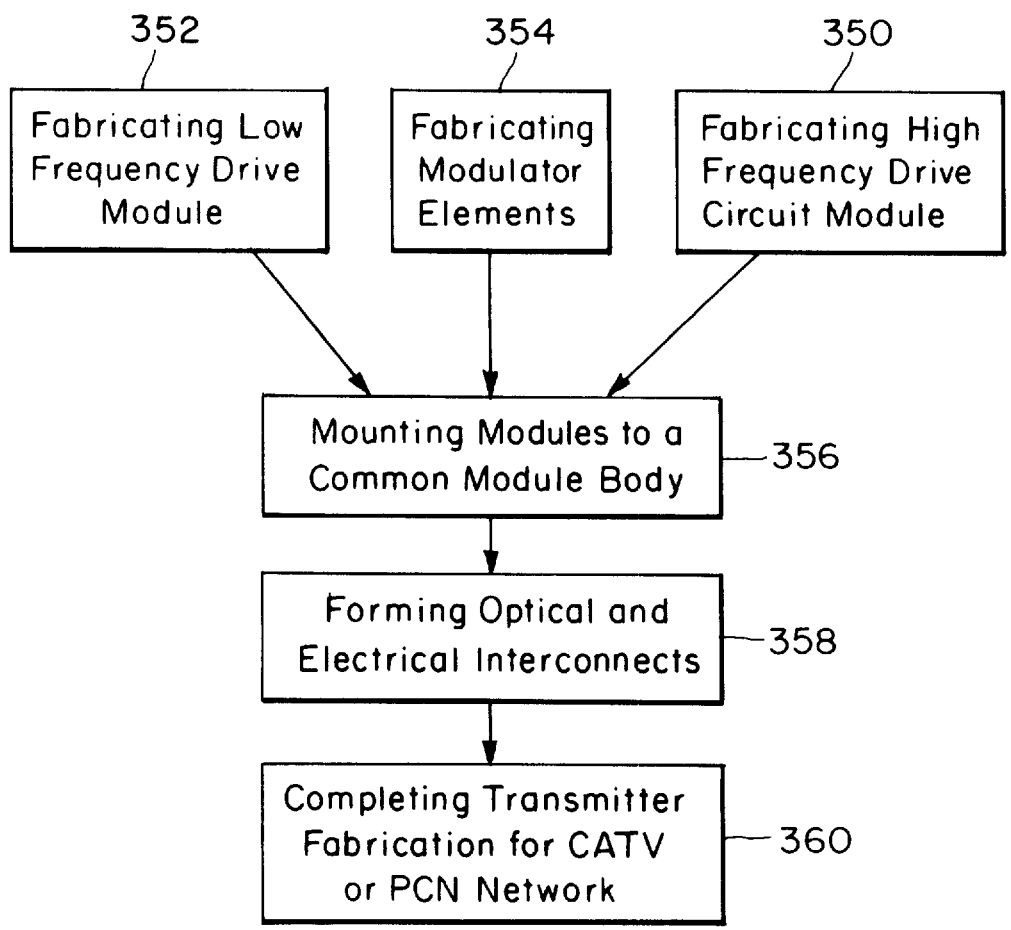

FIG. 10 is a process flow sequence for manufacturing a multi-chip module in accordance with the invention.

DETAILED DESCRIPTION OF THE INVENTION

The present invention provides a linear multi-output optical transmitter system having multi-octave bandwidth multiplication. The system takes advantage of optical splitting, external modulation, predistortion, and multi-chip fabrication techniques to provide multiple transmitters having minimized second and third order distortion characteristics.

Figure 2:
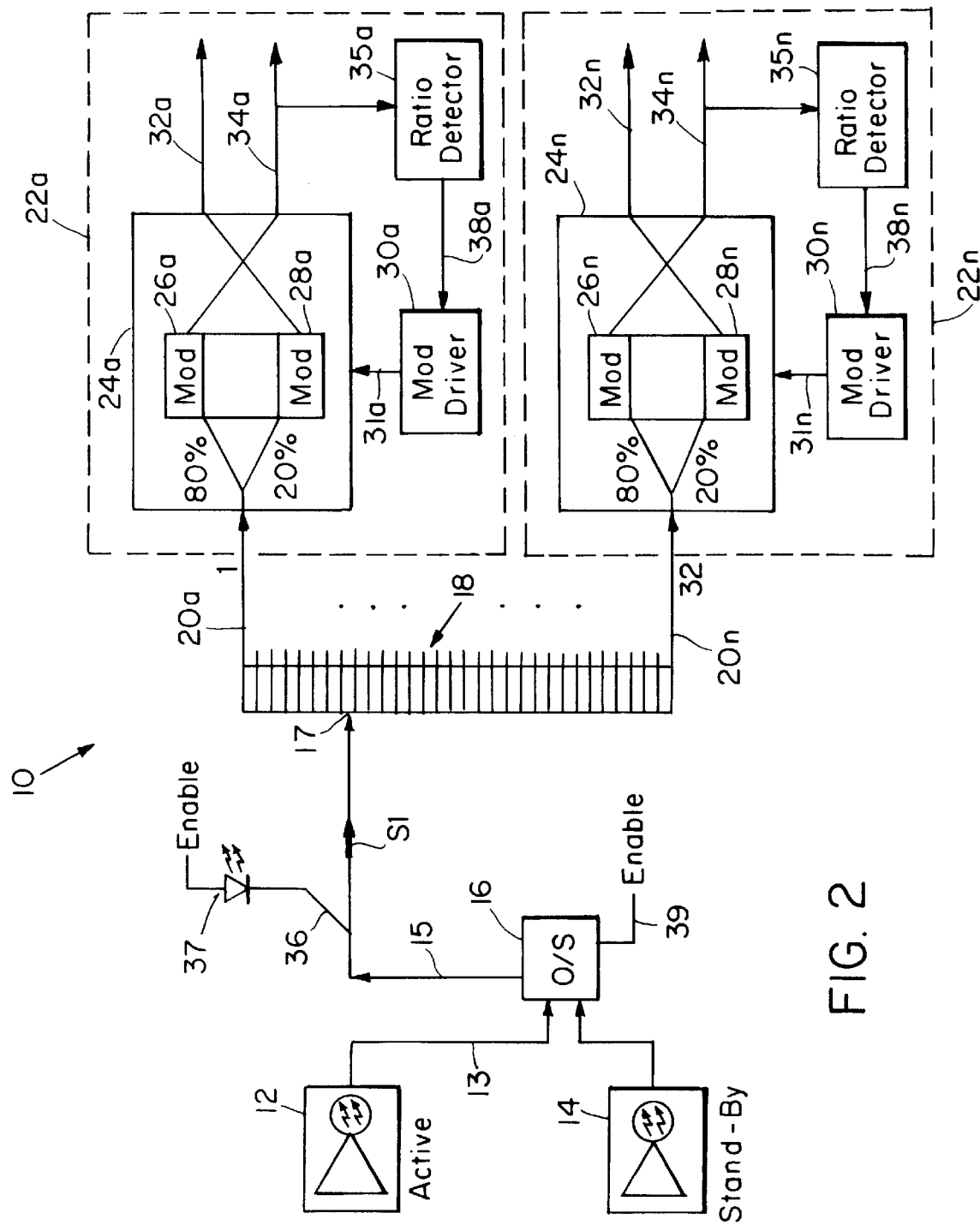
FIG. 2 is a schematic block diagram of a preferred embodiment of the present invention.

Referring to FIG. 2, a preferred embodiment of the present invention is shown. A continuous wave (CW) laser source 12 is coupled through an optical switch 16 to an input 17 of an optical divider splitter 18. The optical splitter 18 is 1×N polarization maintaining planar optical waveguide, configured in the preferred embodiment to provide N=32 individual outputs. In other embodiments, N=16 or another number depending on the particular application. For N=32, the 1 through 32 outputs 20a–20n are coupled to individually modulated transmitters 22a–22n. The transmitters 22a–22n provide dual outputs 32a, 34a through 32n, 34n for a total of 32 dual channels or 64 individual outputs. Thus, the system 10 can split and modulate an optical carrier signal S1 of the single cw laser source 12 to serve up to 64 downstream receiver nodes (not shown).

A standby cw laser source 14 is optically coupled to the optical switch 16 to provide a standby laser source for the system. Each of the cw laser sources 12 and 14 is preferably a 300 mW yttrium aluminum garnet (YAG) laser. The optical signal on line 15 is monitored by a photo detector 37 coupled through line 36. In the event the power from the active laser source 12 falls below a minimum threshold level, the optical switch 16 will be activated via an enable signal 39 to switch the standby laser source 14 into service on line 15.

The transmitter 22a includes an external modulation block 24a, an Rf modulator driver block 30a, and a ratio detector 35a, each of which is described further below. The external modulation block 24a includes dual external modulators 26a, 28a in a parallel configuration. The external modulators 26a, 28a are driven in parallel by the Rf modulator driver block 30a. The ratio detector 35a detects distortion products and produces correction signals in response thereto which are input to the RF modulator driver block 30a.

Figure 1:
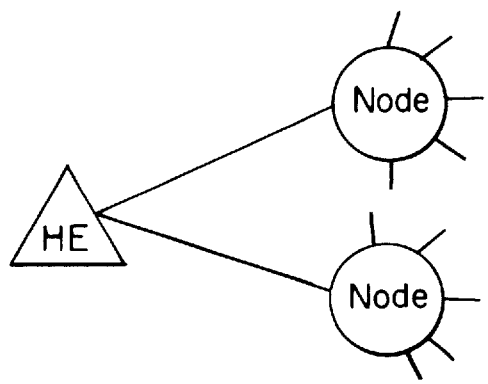
FIG. 1 is a representation of a prior art CATV distribution arrangement.
Figure 3:
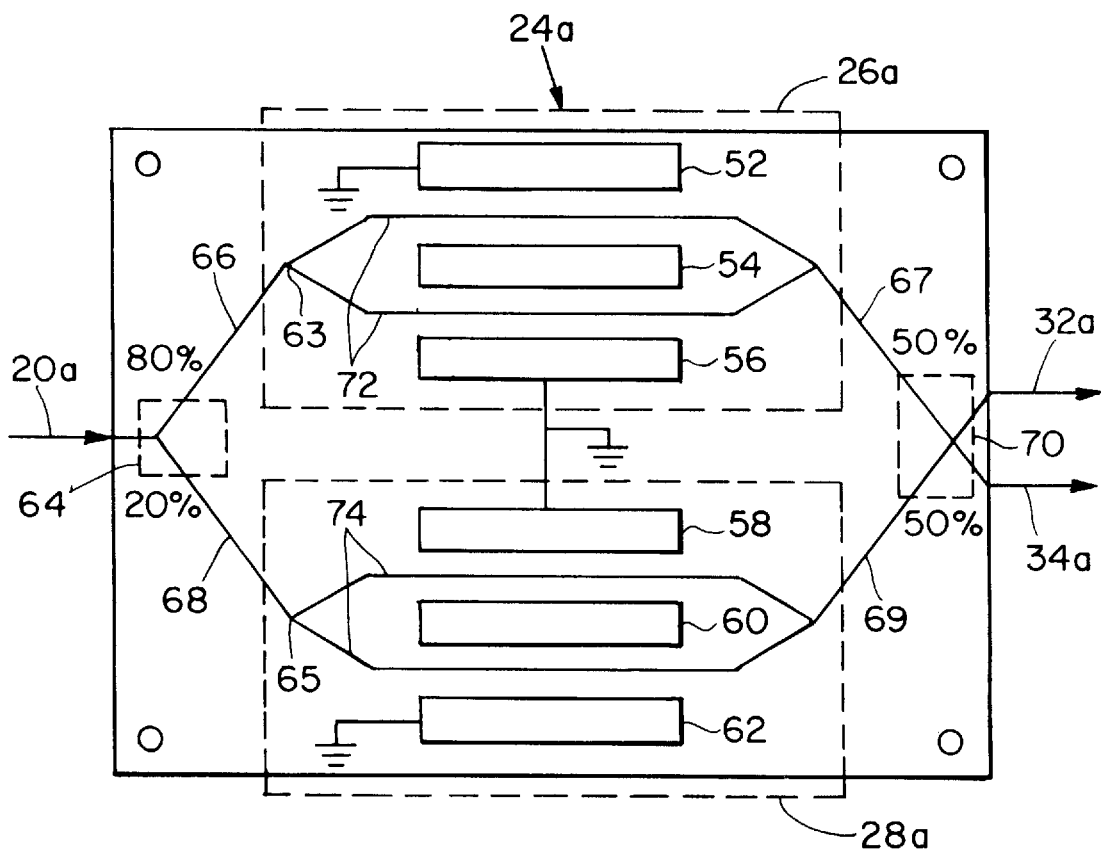
FIG. 3 is a block diagram of the external modulation block of the system in FIG. 2.

Referring to FIG. 3, the external modulation block 24a is shown in more detail. An optical carrier signal on output path 20a from optical splitter 18 (FIG. 2) is coupled to a proportional coupler 64 which splits the optical signal proportionally onto paths 66 and 68 such that path 66 carries 80% of the signal and path 68 receives 20%. The proportional outputs on paths 66, 68 are respectively coupled to inputs 63, 65 of the dual external modulators 26a, 28a.

The dual external modulators 26a, 28a are preferably Mach-Zehnder interferometers. External modulator 26a has an individual control portion which includes a center electrode 54 and other electrodes 52, 56. Dual waveguides 72 of external modulator 26a extend in the space between the electrodes. External modulator 28a is similarly configured with center electrode 60, outer electrodes 58, 62 and dual waveguides 74. The outer electrodes 52, 56, 58, 62 of the external modulators are connected to ground potential. The center electrode 54 of external modulator 26a is connected to a main driver signal from RF modulator driver block 30a

4

(FIG. 2). The center electrode 60 of external modulator 28a is connected to a scaled and inverted driver signal from RF modulator driver block 30a (FIG. 2). The modulated outputs 67, 69 of the respective Mach-Zehnder modulators 26a, 28a are superimposed at a combiner 70 to produce resultant dual outputs 32a, 34a.

Prior work on external modulation has been focused on single octave bandwidth and special applications at a single frequency. Recently there has been work on using dual modulators focused on noise figure in a sub-octave bandwidth, series modulator configuration, where second order distortion is not a problem and signal to noise improvement is addressed.

The approach of dual parallel modulation is described in Korotky et al., "Dual Parallel Modulation Schemes for Low-Distortion Analog Optical Transmission", IEEE Journal on Selected Area in Communications, Vol. 8, No. 7, September 1990. Dual parallel modulation achieves linearization by using the distortion created by a secondary modulator to cancel the distortion produced by a primary modulator. The present invention improves upon the known dual parallel linearization schemes by providing coherent dual parallel linearization without requiring additional phase modulation in either of the two modulator output paths to maintain quadrature between the primary and secondary modulator signals.

Figure 4A:
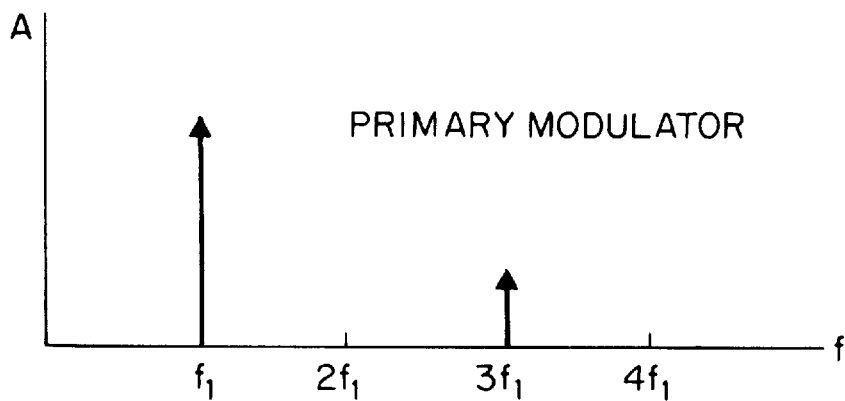
FIG 4a–4c are graphs schematically illustrating the distortion cancellation achieved by the external modulation block in FIG. 3.
Figure 4B:
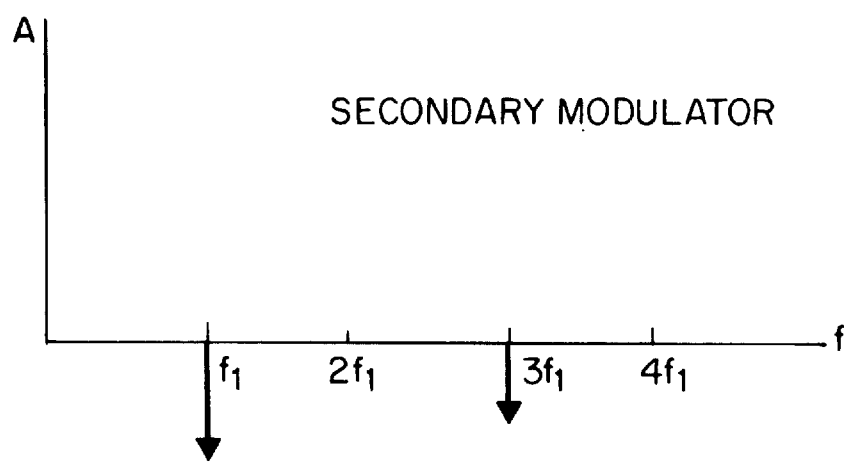
Figure 4C:
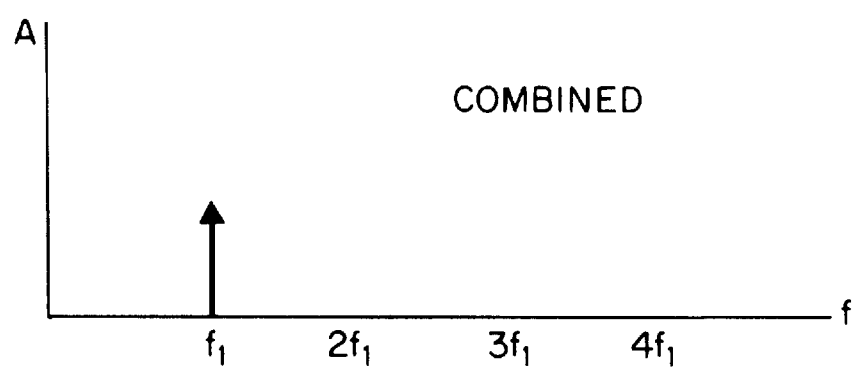

In the preferred embodiment, external modulators 26a, 28a function respectively as the primary and secondary modulators to achieve cancellation of the third order components in the modulated optical signal produced on the outputs 32a34a as shown in FIG. 4a–4c. Although the fundamental suffers a small loss of power, this is a practical implementation. The need for additional phase modulation in either of the two modulator output paths to maintain quadrature between the primary and secondary modulator signals is eliminted in the scheme of the present invention by the processing technique utilized to fabricate a single lithium niobate die having very controlled photolithographic processes and diffusion. The process of annealing this multi-chip die at low temperatures in a wet oxygen bath subsequent to an initial titanium diffusion phase stabilizes the device. This stabilization process in effect eliminates any changes in phase in an operational environment.

Figure 5:
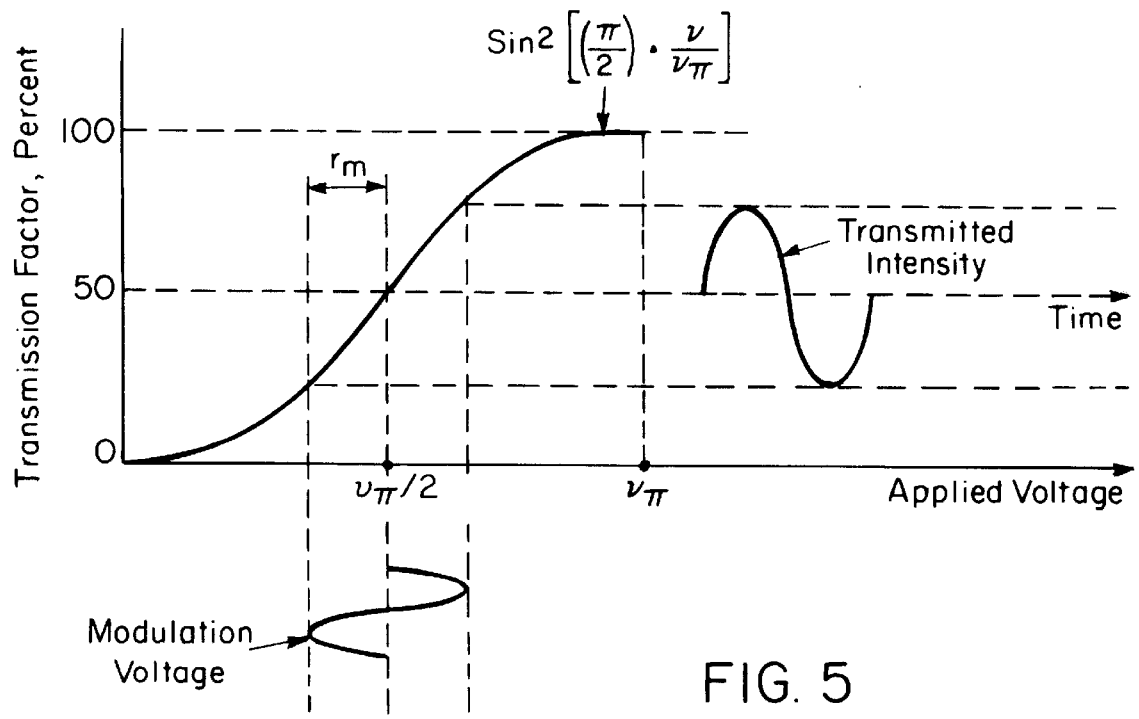
FIG. 5 is a graph schematically illustrating the transfer function of an external modulator.

An external modulator has a sinusoidal transfer function which results in second and third order distortion products in the modulated output signal. The transfer function is illustrated in FIG. 5. Operating such a modulator at a quadrature point, i.e., a DC bias of $\pi/2$, eliminates even-order distortion products. However, in reality, a perfectly symmetrical sine function cannot be achieved. The lack of sine wave symmetry creates second order residue over the operational bandwidth.

The Mach-Zehnder modulators 26a, 28a are each operated at the quadrature point $\pi/2$. Maintaining the modulators 26a, 28a at their respective quadrature points is achieved by the ratio detector 35a in combination with the RF modulator driver block 30a (FIG. 2). The ratio detector 35a monitors second and third order distortion and creates feedback correction signals to the modulator driver block 30a which in turn repositions the DC bias on the modulation curve, as discussed further below. The ratio detector 35a to an optical receiver. The signal detected by the optical received is used to generate the feedback correction signals.

The theory of the ratio detector 35a can be understood by first noting that the optical field signal input to the external modulation block 24a varies as:

$$E_{in} = A \cos \omega t$$

$$E_{out} = A\cos\left[\omega t - \frac{\omega}{c}\left(n_o - \frac{n_o^3}{2} rE_m \sin\omega_m t\right)l\right]$$

where l is the optical path length through the lithium niobate crystal.

Rewrite as $$E_{out} = A \cos[\omega t + \delta \sin \omega_m t]$$

where δ is the phase modulation index, and $$\delta = \frac{\omega n_o^3 rE_m l}{2c} = \frac{\pi n_o^3 rE_m l}{\lambda}$$

using Bessel function identities:

$$\cos(\delta \sin \omega_m t) = J_0(\delta) + 2J_2(\delta)\cos \omega_m t$$

$$\sin(\delta \sin \omega_m t) = 2J_1(\delta)\sin \omega_m t + 2J_3(\delta)\sin 3\omega_m t$$

Rewriting:

$$E_{out} = A[J_0(\delta)\cos \omega t + J_1(\delta)\cos(\omega+\omega_m)t$$

$$J_1(\delta)\cos(\omega-\omega_m)t + J_2(\delta)\cos(\omega+2\omega_m)t]$$

Detecting the ratio of $J_2/J_1$ and producing a feedback correction signal can compensate for any second order distortion. Additionally, the ratio of $J_3/J_1$ can be used to produce a correction signal to keep the DC bias at $\pi/2$.

Figure 6:
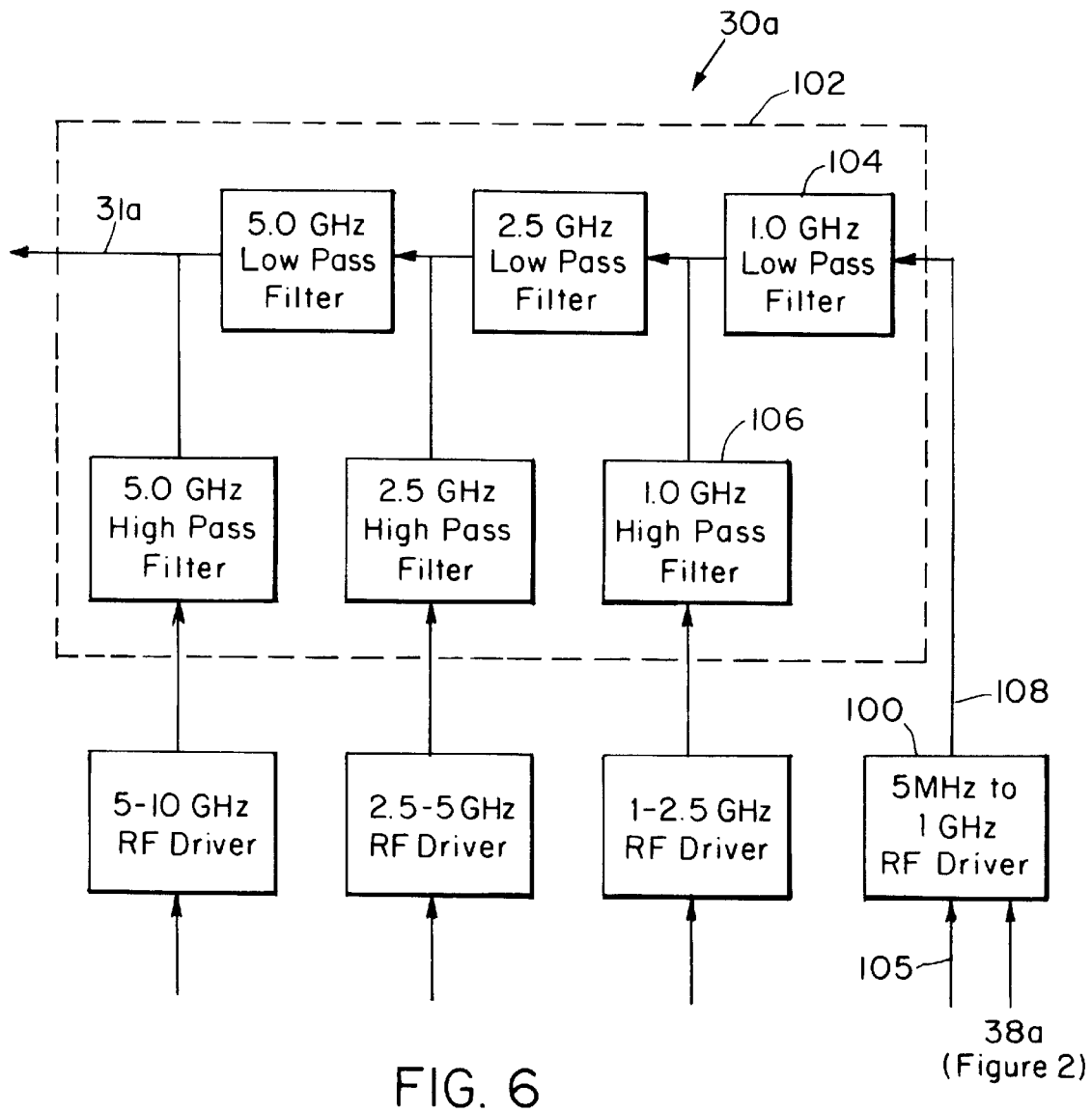
FIG. 6 is a block diagram of the RF modulator driver block of the system in FIG. 2.

Typical industry standards require that total distortion products in an operational CATV distribution system be maintained below −60 db over the entire bandwidth to meet the fidelity expected by individual subscribers. Factors which limit amplitude modulation over multi-octave bandwidths are noise figure, dynamic range and bandwidth of driver electronics. Since an external optical modulator has a very large modulation bandwidth, multi-chip RF modulator drive circuitry is employed to meet performance over multi-octave bandwidth, as shown in FIG. 6. In order to cover the wide bandwidth possible with the multi-chip modulation scheme, individual RF modulator driver circuits 100 are coupled to a passive broadband equalizer combiner 102. The equalizer combiner 102 in turn drives the optical modulators from a single output 31a. In the preferred embodiment, the individual RF modulator driver circuits 100 are divided into four bands: 5 MHz to 1 GHz, 1 GHz to 2.5 GHz, 2.5 GHz to 5 GHz to 10 GHz. These bands are noted for example purposes only and not as a limitation on the present invention. The equalizer combiner 102 comprises a configuration of low pass filters 104 in series and high pass filters 106 in parallel.

Figure 7:
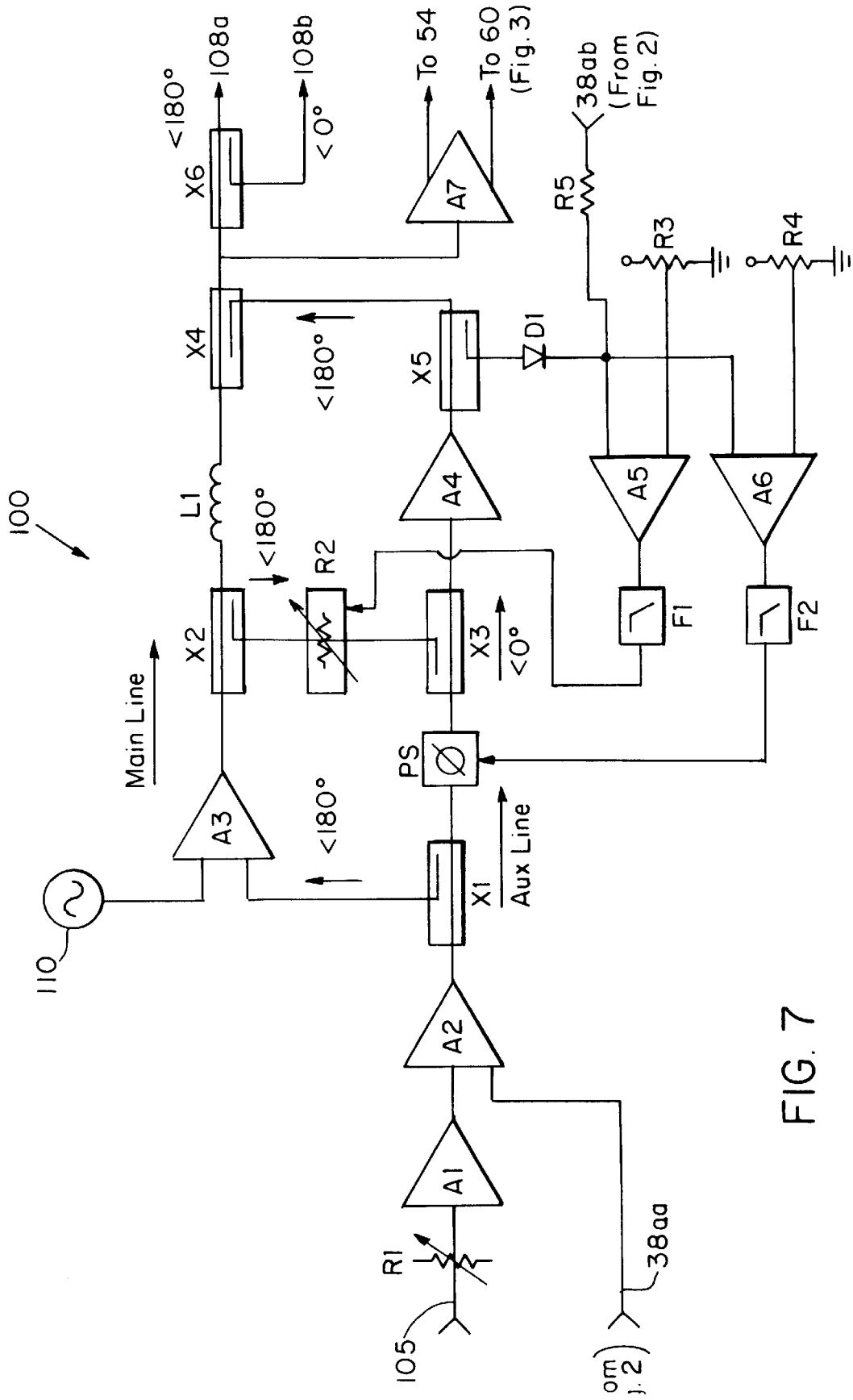
FIG. 7 is a schematic block diagram of an RF modulator driver circuit of the modulator driver block in FIG. 6.

FIG. 7 shows an RF modulator drive circuit 100 of the RF modulator driver block 30a. The RF modulator drive circuit 100 uses feed forward cancellation. Feed forward cancellation inverts a sample of the undistorted input signal and adds it to a signal of a main line amplifier output containing both the input signal and distortion products created within the main line amplifier itself. The resultant output includes the distortion products which are inverted and amplified by a highly linear distortion amplifier A4 and then linearly summed with a main line amplifier output signal combining vectorally to cancel the distortion products.

Referring to FIG. 7 to provide more details of the RF modulator driver circuit 100, a baseband input signal 105 is level set using input attenuator R1. The level to input signal 105 is provided from an external source from a down converted signal. The attenuator R1 assures that any input level is below a point where internal amplifiers can approach a saturation level which generates internal distortion. The input signal 105 is amplified through amplifiers A1, A2 and MAIN LINE amplifier A3 to produce output signals 108a, 108b which are 108 degrees out of phase relative to each other. The output signals 108a, 108b provide the RF input which modulates the optical carrier signal in the external modulation block 24a (FIG. 2).

Distortion in the RF driver signal is detected by the distortion detector diode D1. A distortion signal is coupled through coupler X1 to the MAIN LINE amplifier A3 with any distortion component 180 degrees out of phase with the signal simultaneously coupled through coupler X1 on the AUX LINE due to voltage variable phase shifter PS. A portion of the signal which has distortion in the MAIN LINE is coupled back through couplers X2, X3 at 180 degrees out of phase and added to the AUX LINE signal. This combined signal is amplified by distortion amplifier A4 and coupled through couplers X5, X4 to the MAIN LINE signal at a 180 degrees phase shift.

Additionally, a tone source 110 is coupled to the RF driver circuit through MAIN LINE amplifier A3 to provide a tone signal for the purpose of detecting distortion in the external modulation block 24a through ratio detector 35a (FIG. 2 and 3). The tone signal, preferably at a frequency outside the operational bandwidth, e.g., below 50 MHz, is proportional to the RF drive and can generate distortion side bands as described below. An output 38aa from the ratio detector 35a (FIG. 2) is input to amplifier A2 to correct for any second order distortion. An output 38ab from the ratio detector 35a is input to amplifier A5 to correct the DC bias to the external modulation block 24a such that the quadrature point is maintained. The output of amplifier A5 passes through a lowpass filter F1 and feeds a voltage variable attenuator R2.

The operational amplifiers A5 and A6 form a summing junction for an AGC correction loop. This junction sums an error feed back from the amplifier and optical modulation. The AGC loop which is a second order loop is established through amplifiers A5 and A6 and closed through the phase shifter PS and attenuator R2. The filters F1 and F2 set the loop time constraints establishing noise rejection and time bandwidth products for loop response. The distortion correction and DC bias is maintained through the AGC loop. The DC bias to the amplifier is buffered and scalped through amplifier A7 and fed to the optical modulator to maintain a $\pi/2$ bias condition on the modulation curve.

Figure 8:
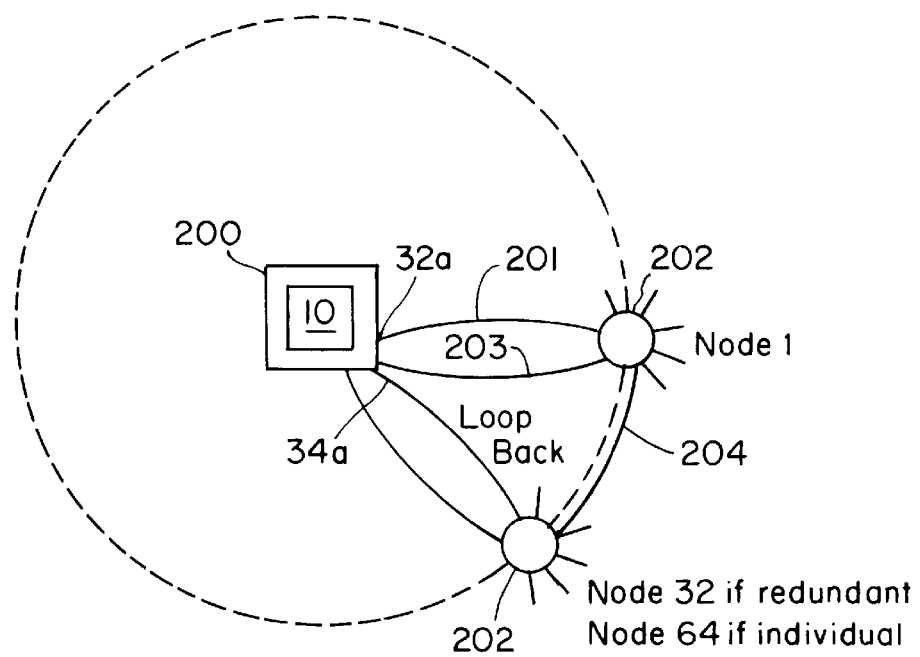
FIG. 8 illustrates a network topology employing the present invention.

The linear multi-output optical transmitter system of the present invention allows a greater number of transmitters to be driven from one high powered laser. Referring to FIG. 8, a layout is illustrated in which the system 10 of the present invention is located at a headend site 200. Each individual modulated transmitter is shown supporting a single node 202 with redundant outputs 32a, 34a over optical fibers 201, 203 respectively. In addition, the nodes 202 can be connected through a daisy chain 204 to provide further redundancy. This redundant configuration increases both network reliability and subscriber bandwidth. Alternatively, the redundant outputs 32a, 34a can each support a single node, thereby increasing the number of subscribers served. In the preferred embodiment, either 32 redundant nodes or 64 individual nodes can thus be supported. With either configuration employing the present invention, service providers can distribute more services over the same cable plant with a transmitter cost that is far less than today's cost.

In addition to present communication networks, the transmitter system of the present invention is well-suited to address emerging personal communication networks (PCNs). PCNs are wireless networks which are being configured to operate at 2 and 4 GHz. One method favored for PCN transmission uses a spread spectrum technique whereby a very low power RF signal having a wide frequency range is transmitted. There are significant drawbacks to operating with this scheme. First, the higher carrier frequency (e.g. 2 GHz) cannot penetrate obstructions but is instead absorbed. Thus, PCN transmission is line of sight. Second, spread spectrum requires a wide bandwidth.

The relatively large bandwidth and high frequencies of PCNs are well-suited to the present invention. Referring to FIG. 9, a layout is schematically illustrated in which the system 10 of the present invention is located at a cell site 300. An obstruction 308, e.g., a building, separates cell site 300 from another cell site 320. The multi-octave bandwidth capability of the electronic driver and optical modulation of the system 10 allows direct modulation by an RF input signal from an RF receiver 310. The output from the system 10 can be transported through or around the line of sight obstruction 308 via an optical fiber cable 312 to be received and retransmitted at cell site 320. The signal is received by an optical receiver 314 and retransmitted by RF transmitter 316. An advantage of the present invention in this arrangement is that own conversion and up conversion of the RF signal at the respective cell sites 300, 320 is eliminated.

A significant feature of the transmitter system is its modular packaging. The modularized configuration allows for individual testing of components and ease of access and replacement which enables the system to meet the performance and size constraints required by industry in an operational environment. Specifically, each driver and modulator can be mounted on a common module body. Thus in the preferred embodiment, the total transmitter assembly comprises 32 dual or 64 single transmitters packaged in an area two orders of magnitude smaller than equivalent transmitters existing today. For example, the transmitter assembly can fit in a 14 inch panel while an equivalent transmission system with existing technologies occupies three full 84 inch racks.

As noted above, the transmitter module includes a multi-chip electronic driver and a dual parallel multi-chip modulator. The dual parallel multi-chip modulators can be fabricated on a single substrate of lithium niobate which insures control of the basic phase and propagation delay parameters. Referring again to FIG. 3, the external modulation block 24a is fabricated on a common lithium niobate substrate to form a multi-chip configuration. The dual chip is packaged in either a Kovar or ceramic package having co-efficient of expansion characteristics which are small over the entire environmental range. Line length and width can be controlled to maintain both phase and amplitude which are critical to performance. The Mach-Zehnder modulators 26a and 28a are traveling wave interferometers which offer the advantage of allowing a lower drive voltage, e.g., approximately +/−1.5 volts into 50 ohms. This in turn reduces the burden on the RF modulator driver circuitry discussed above. The optical modulator and the optical dividers employ similar processing techniques-vapor phase deposition, molecular beam epitaxy, diffusion, and bath metal dry etch. A completed package may include a planar waveguide divider, modulator, and electronic driver configured in an electro-optic multi-chip module.

The driver is formed in a chip mounted on a common teflon glass substrate as a low dielectric carrie. This configuration eliminates differential propagation delay and matches the input and output impedance to the modulators. The multi-chip technique uses unpackaged integrated circuits mounted on a substrate and interconnected by conductors applied using a deposition and photolithgraphy process. The input modulation bandwidth of the lithium niobate optical modulator can be 10 GHz or higher. Providing the RF electrical drive to this device requires traversing several technologies. The low end band requires silicon devices and a teflon glass substrate. Gallium arsenide devices and micro strip transmission lines are used in the higher end. Therefore, one of the keys to achieving performance over the range of frequencies between 5 MHz and 10 GHz is a modularized multi-chip configuration for each range. Another key ingredient is that path length and differential propagation delay are minimized by employing an "embedded chip on carrier" approach. The embedded multi-chip design uses a photolithography process to create exact line width and length which also provides matching structures. The coupler and delay lines in the lower bandwidth configuration made with active silicon components are formed of a lump constant and a low dielectric teflon glass substrate implemented as the carrier.

FIG. 10 illustrates a process of fabricating a multi-chip module in accordance with the invention. In this particular application, both high 350 and low 352 frequency drivers are separately fabricated on gallium arsenide and silicon wafers respectively. The modulator elements 354 also separately fabricated and all these elements are mounted on a common module body at 356. Both optical and electrical interconnects are then formed between module elements using selected line width and length parameters to provide improved operational characteristics.

Equivalents

While this invention has been particularly shown and described with references to preferred embodiments thereof, it will be understood by those skilled in the art that various changes in form and details may be made therein without departing from the spirit and scope of the invention as defined by the appended claims.

What is claimed is:

1. An optical transmission system comprising:
   a laser that produces an optical carrier signal;
   and optical splitter having an input coupled to the laser to receive and split the optical carrie signal to a plurality of splitter outputs; and
   a transmitter coupled to a splitter output comprising:
      a modulator driver for producing a primary analog driver signal and a secondary analog driver signal, the modulator driver comprising a plurality or RF modulator driver circuits, each RF modulator driver circuit having a prescribed bandwidth;
      a first modulator having a driver input that receives the primary analog driver signal and an optical input for receiving a first portion of the optical carrier signal, the first modulator modulating the first portion of the carrier signal with the primary analog driver signal to produce a first modulated signal;
      a second external modulator having a driver input that receives the secondary analog driver signal and an optical input for receiving a second portion of the optical carrie signal, the second modulator modulating the second portion of the carrier signal with the secondary analog driver signal to produce a second modulated signal; and
      a combiner that combines the first modulated signal and the second modulated signal.

2. The system of claim 1 wherein the first and second modulators are Mach-Zehnder modulators.

3. The system of claim 2 wherein the Mach-Zehnder modulators and the combiner are formed on a single lithium niobate substrate.

4. The system of claim 1 wherein the laser is a solid state laser operating at approximately 300 mW.

5. The system of claim 1 further comprising a second continuous wave laser and an optical switch for switching between the active laser and the second laser.

6. The system of claim 1 further comprising a ratio detector coupled to the combiner output for detecting second and third order distortion products and for generating correction signals to compensate for such distortion products.

7. The system of claim 1 wherein the optical splitter is a 1×32 splitter.

8. A multi-octave bandwidth optical transmission system comprising:

a continuous wave laser source for producing an optical carrier signal;

an optical splitter having an input coupled to the laser source to receive and split the optical carrier signal to a plurality of splitter outputs; and a plurality of transmitters, each transmitter being formed on a common module body and having an input coupled to a perspective splitter output, each transmitter comprising:

a modulator driver for producing a primary analog driver signal and a secondary analog driver signal, the primary driver signal being scaled and inverted to produce the secondary driver signal, the modulator driver comprising a plurality of RF modulator driver circuits, each RF modulator driver circuit having a prescribed bandwidth;

a primary external modulator having a driver input for receiving the primary analog driver signal and an optical input for receiving a first portion of the optical carrier signal, the primary modulator modulating the first portion of the carrier signal with the primary analog driver signal to produce a first modulated signal;

a secondary external modulator having a driver input for receiving the secondary analog driver signal and an optical input for receiving a second portion of the optical carrie signal, the secondary modulator modulating the second portion of the carrier signal with the secondary analog driver signal to produce a second modulated signal; and a combiner for superimposing the first modulated signal and the second modulated signal to produce a linearized transmitter output signal.

9. The system of claim 8 wherein the primary and secondary external modulators are Mach-Zehnder modulators.

10. The system of claim 9 wherein the Mach-Zehnder modulators and the combiner of each transmitter are formed on a single lithium niobate substrate.

11. The system of claim 8 wherein the laser is a solid state laser operating at approximately 300 mW.

12. The system of claim 8 further comprising a second continuous wave laser and an optical switch for switching between the active laser and the second laser.

13. The system of claim 8 further comprising a ratio detector coupled to the combiner output for detecting second and third order distortion products and for generating correction signals to compensate for such distortion products.

14. The system of claim 8 wherein the optical splitter is a 1×32 splitter.

15. A method of optical transmission for an analog cable television system, comprising the steps of:

providing an optical carrier signal from a laser source;

providing a plurality of transmitters, each transmitter including a modulator device, a modulator driver circuit and a detector connected to the modulator driver circuit, the device, circuit and detector being mounted on a common module body;

splitting the optical carrie signal to a plurality of splitter output signals;

for each splitter output signal:

modulating the splitter output signal with a modulator device controlled by an analog driver signal to produce a modulated signal;

detecting the modulated signal with a detector, the detector being connected to a modulator driver circuit;

controlling distortion in the modulated signal by adjusting the driver signal from the modulator driver circuit in response to the detected modulated signal; and transmitting the modulated signals in a plurality of different frequency bands on a fiber optic cable television network.

16. The method of claim 15 wherein the modulator device comprises dual parallel Mach-Zehnder modulators.

17. The method of claim 15 wherein the step of detecting the modulated signal includes detecting second and third order distortion products and the step of controlling distortion includes generating correction signals to compensate for such distortion products.

18. The method of claim 15 further comprising predistorting the analog driver signal to compensate for second order products produced by the modulator device.

19. The method of claim 15 wherein each modulator driver circuit comprises plural RF modulator driver circuits each having a prescribed bandwidth.

* * * * *

UNITED STATES PATENT AND TRADEMARK OFFICE
CERTIFICATE OF CORRECTION

PATENT NO. : 5,875,048
DATED : February 23, 1999
INVENTOR(S): Joseph E. Nemecek, Michael J. Noonan and Amaresh Mahapatra It is certified that error appears in the above-indentified patent and that said Letters Patent is hereby corrected as shown below:

Column 8, line 43: change "carrie" to ---carrier---
Column 8, line 60: change "carrie" to ---carrier---

Column 9, line 24: change "perspective" to ---respective---
Column 9, line 44: change "carrie" to ---carrier---

Column 10, line 23: change "carrie" to ---carrier---

Signed and Sealed this

Thirteenth Day of July, 1999

Attest:

Attesting Officer

Q. TODD DICKINSON

Acting Commissioner of Patents and Trademarks